US008719485B2

(12) United States Patent
Sutardja et al.

(10) Patent No.: US 8,719,485 B2
(45) Date of Patent: May 6, 2014

(54) SOLID-STATE DISK WITH WIRELESS FUNCTIONALITY

(75) Inventors: Sehat Sutardja, Los Altos Hills, CA (US); Po-Chien Chang, Milpitas, CA (US); Roawen Chen, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 749 days.

(21) Appl. No.: 12/401,807

(22) Filed: Mar. 11, 2009

(65) Prior Publication Data

US 2009/0327588 A1 Dec. 31, 2009

Related U.S. Application Data

(60) Provisional application No. 61/076,396, filed on Jun. 27, 2008.

(51) Int. Cl.
*G06F 13/00* (2006.01)

(52) U.S. Cl.
USPC ............... 711/103; 710/313; 711/E12.02

(58) Field of Classification Search
USPC ............................................. 711/103
See application file for complete search history.

(56) References Cited

U.S. PATENT DOCUMENTS

| 6,732,250 | B2 | 5/2004 | Durrant |
| 6,940,523 | B1 * | 9/2005 | Evoy ........................... 345/604 |
| 7,023,445 | B1 * | 4/2006 | Sell ............................. 345/557 |
| 7,702,821 | B2 * | 4/2010 | Feinberg et al. ............... 710/13 |
| 8,200,883 | B2 * | 6/2012 | MacWilliams et al. ............ 711/5 |
| 2001/0025332 | A1 * | 9/2001 | Wang et al. .................... 710/132 |
| 2004/0089948 | A1 * | 5/2004 | Cheng et al. ................... 257/758 |
| 2005/0114587 | A1 * | 5/2005 | Chou et al. .................... 711/103 |
| 2005/0120164 | A1 * | 6/2005 | Yang et al. .................... 711/103 |
| 2006/0149895 | A1 * | 7/2006 | Pocrass ......................... 711/103 |
| 2006/0161709 | A1 * | 7/2006 | Davies .......................... 710/268 |
| 2006/0248244 | A1 * | 11/2006 | Hua .............................. 710/62 |
| 2007/0094504 | A1 * | 4/2007 | Takinosawa et al. ........... 713/172 |
| 2007/0124614 | A1 * | 5/2007 | Lee et al. ...................... 713/300 |
| 2007/0140191 | A1 * | 6/2007 | Kojima ......................... 370/338 |
| 2007/0226416 | A1 * | 9/2007 | Yi-Ching ...................... 711/115 |
| 2007/0239929 | A1 * | 10/2007 | Chen et al. .................... 711/103 |
| 2008/0089020 | A1 * | 4/2008 | Hiew et al. .................... 361/684 |

(Continued)

FOREIGN PATENT DOCUMENTS

| JP | S59-109966 | 6/1984 |
| JP | H06-124175 | 5/1994 |

(Continued)

OTHER PUBLICATIONS

Non-Volatile Memory Host Controller Interface (NVMHCI) 1.0; Amber Huffman; Intel Corporation; Apr. 14, 2008; 65 pages.
ONFi Open NAND Flash Interface; Open NAND Flash Interface Specification; Revision 2.0; Amber Huffman; Intel Corporation; Feb. 27, 2008; 174 pages.

(Continued)

*Primary Examiner* — Sean D Rossiter

(57) ABSTRACT

A solid-state disk (SSD) controller includes a first integrated circuit (IC) that includes an interface module, a memory control module, and a wireless network interface module. The interface module externally interfaces the SSD controller to a computing device. The memory control module controls solid-state memory, receives data from the computing device via the interface module, and caches the data in the solid-state memory. The wireless network interface module communicates with the computing device via the interface module and allows the computing device to connect to a wireless network.

24 Claims, 14 Drawing Sheets

(56) References Cited

U.S. PATENT DOCUMENTS

| | | | | |
|---|---|---|---|---|
| 2008/0133821 A1* | 6/2008 | Ganesan et al. | | 711/103 |
| 2008/0142959 A1* | 6/2008 | DeMulder et al. | | 257/723 |
| 2008/0183953 A1* | 7/2008 | Flynn et al. | | 711/103 |
| 2008/0279382 A1* | 11/2008 | Chen et al. | | 380/277 |
| 2009/0059658 A1* | 3/2009 | Cho et al. | | 365/163 |
| 2009/0138628 A1* | 5/2009 | Kanade | | 710/27 |
| 2009/0150584 A1* | 6/2009 | Tan et al. | | 710/106 |
| 2009/0235014 A1* | 9/2009 | Yim et al. | | 711/103 |
| 2009/0271536 A1* | 10/2009 | Tiennot | | 710/28 |

FOREIGN PATENT DOCUMENTS

| | | | |
|---|---|---|---|
| JP | 2003-086698 | | 2/2003 |
| JP | 2005-044012 | | 2/2005 |
| JP | 2005-526407 | | 9/2005 |
| JP | 2006-164024 | | 6/2006 |
| JP | 2008-503154 | | 1/2008 |
| KR | 20020064748 | * | 8/2002 |
| KR | 200200645748 | | 8/2002 |
| WO | WO00/51005 | | 8/2000 |
| WO | WO2004/077306 | | 9/2004 |
| WO | WO 2005122711 A2 | * | 12/2005 |

OTHER PUBLICATIONS

Dixon, Douglas. "Eye-Fi—Wi-Fi SD Chard for Digital Cameras." MANIFEST TECHNOLOGY. Dec. 2007. Web. Jul. 22, 2009. <www.manifest-tech.com/ce_photo/eye-fi-wi-fi.htm> 5 pages.

Gardiner, Bryan. "Group Forms to Push ReadyBoost Hybrid Drives." EXTREMETECH. May 30, 2007. Web. Jul. 22, 2009. <www.extremetech.com/article2/0>, 1 page.

Notification of Transmittal of The International Search Report and the Written Opinion of the International Searching Authority, or The Declaration dated Aug. 6, 2009 in reference to PCT/US2009/045139 (16 pgs).

Scansen, Don. "Oddjobs." SEMICONDUCTORBLOG. Oct. 9, 2007. Web. Jul. 22, 2009. <www.semiconductorblog.com/2007/10/09/oddjobs/> 3 pages.

ZCOMAX Technologies. "XG180 MU Embedded WLAN Module." Aug. 2005. Web. Jul. 22, 2009. <www.zcomax.com/embedded/XG-180MU/XG-180MU-DS.pdf> 10 pages.

Communication dated May 30, 2012 enclosing Non-Final Notice of Reasons for Rejection from the Japan Patent Office for Application No. 2011-516381; 9 pages.

* cited by examiner

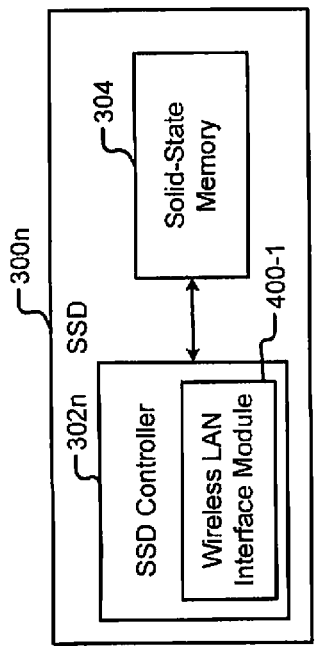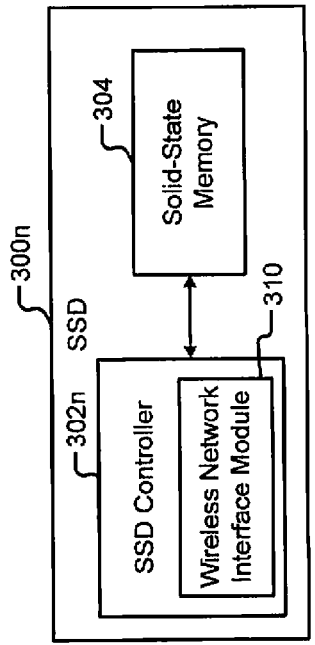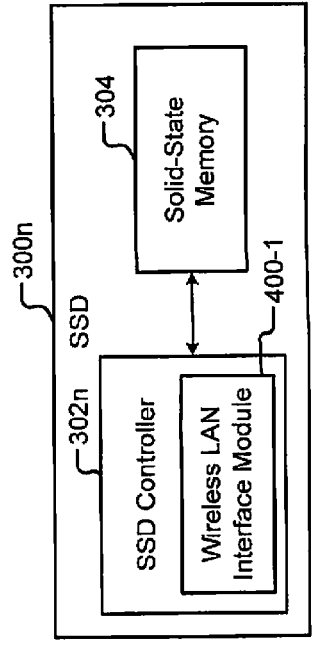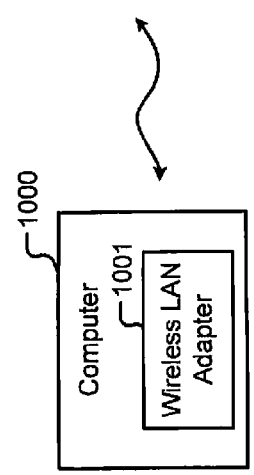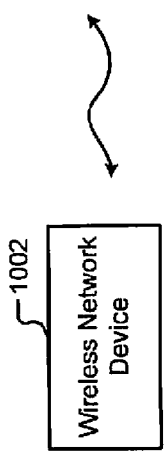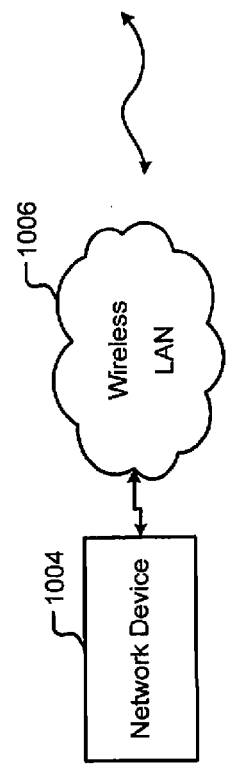
FIG. 10A   FIG. 10B   FIG. 10C

SOLID-STATE DISK WITH WIRELESS FUNCTIONALITY

CROSS-REFERENCE TO RELATED APPLICATIONS

This application claims the benefit of U.S. Provisional Application No. 61/076,396, filed on Jun. 27, 2008. The disclosure of the above application is incorporated herein by reference in its entirety.

FIELD

The present disclosure relates to solid-state disk controllers with integrated wireless network devices.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Many laptop and notebook computers (hereinafter computers) use solid-state memory (e.g., flash memory) to cache data that is frequently used by applications running on the computers. Using solid-state memory to cache frequently used data can offer many benefits. For example, system performance can be improved by caching frequently used data in solid-state memory since the access time of solid-state memory is considerably shorter than the access time of hard disk drives (HDDs). Additionally, since solid-state memory typically consumes less power than the HDDs, the power consumption of the computers can be reduced by caching frequently used data in solid-state memory and spinning down or turning off the HDDs for extended periods of time.

Solid-state memory can be used to cache data in many ways. For example, in some computers, flash memory is integrated into the HDDs. The HDDs with integrated flash memory for caching data are called hybrid HDDs. In hybrid HDDs, however, caching is problematic. Specifically, when a hybrid HDD receives data, the hybrid HDD cannot determine whether the data needs to be cached in the flash memory or stored on the HDD. This is because both the flash memory and the HDD receive the data via the same interface of the hybrid HDD (e.g., SATA interface), and the interface cannot differentiate the data that needs to be cached from the data that need not be cached.

Alternatively, external solid-state disks (SSDs) comprising solid-state memory can be plugged into the computers to cache the frequently used data. Unlike the hybrid HDDs that include both the solid-state memory and the HDDs, the external SSDs are separate devices from the HDDs. Device drivers for the external SSDs are separate from the device drivers for the HDDs. The device drivers for the SSDs comprise caching modules that can identify the data that needs to be cached. The device drivers for the SSDs route the data that needs to be cached to the SSDs instead of the HDDs. Accordingly, frequently used data can be easily cached to the SSDs. Additionally, the SSDs may be used as primary storage devices instead of or in addition to the HDDs when the cost of the SSDs comes down.

Referring now to FIG. 1, a notebook computer 200 comprises a central processing unit (CPU) 202 that utilizes a peripheral component interconnect express (PCIe) bus 204 for communicating with internal peripheral devices. For example, the internal peripheral devices may include a HDD 206 having a PCIe interface 208. Additionally, the notebook computer 200 provides a PCIe slot 210 for connecting an external device having a PCIe connector to the notebook computer 200. The external device may include a SSD 212. The SSD 212 is typically manufactured as a 2.5" form-factor device. The SSD 212 comprises a PCIe connector 214 that plugs into the PCIe slot 210, a SSD controller 216, and solid-state memory 218. The solid-state memory 218 may include flash memory.

Additionally, the notebook computer 200 may comprise one or more wireless network adapters for communicating with other wireless network devices. The wireless network adapters may include a wireless local area network (LAN) adapter 220, a Bluetooth® (BT) adapter 222, and/or a cellular network adapter 224. The wireless network adapters are typically integrated on a motherboard (not shown) of the notebook computer 200.

The CPU 202 runs an operating system (OS) stored on the HDD 206. The OS includes device drivers that allow the internal and external peripherals to communicate with the CPU 202 via the PCIe bus 204. When the SSD 212 is plugged into the PCIe slot 210, the CPU 202 communicates with the SSD 212 using a device driver for the SSD 212 and selectively caches data in the SSD 212.

SUMMARY

A solid-state disk (SSD) controller comprises a first integrated circuit (IC) that includes an interface module, a memory control module, and a wireless network interface module. The interface module externally interfaces the SSD controller to a computing device. The memory control module controls solid-state memory, receives data from the computing device via the interface module, and caches the data in the solid-state memory. The wireless network interface module communicates with the computing device via the interface module and allows the computing device to connect to a wireless network.

The first IC comprises a secure digital input output (SDIO) interface module that interfaces the wireless network interface module to the interface module. The first IC comprises a crossbar module. The memory control module, the wireless network interface module, and the interface module communicate via the crossbar module.

A system comprises a single multi-chip module (MCM) that is manufactured on a first integrated circuit (IC) and a second IC that is stacked on top of the first IC. The MCM includes a solid-state disk (SSD) controller. The SSD controller comprises an interface module, a memory control module, and a secure digital input output (SDIO) interface module. The interface module externally interfaces the SSD controller to a computing device. The memory control module controls solid-state memory, receives data from the computing device via the interface module, and caches the data in the solid-state memory. The SDIO interface module interfaces a wireless network interface module to the interface module. The second IC comprises double-data-rate (DDR) memory that communicates with at least one of the interface module, the memory control module, and the SDIO interface module.

Further areas of applicability of the present disclosure will become apparent from the detailed description, the claims and the drawings. It should be understood that the detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 10A is a functional block diagram of a SSD that communicates with a computer according to the present disclosure;

FIG. 10B is a functional block diagram of a SSD that communicates with a wireless network device according to the present disclosure;

FIG. 10C is a functional block diagram of a SSD that communicates with a network device according to the present disclosure;

DESCRIPTION

Figure 1:
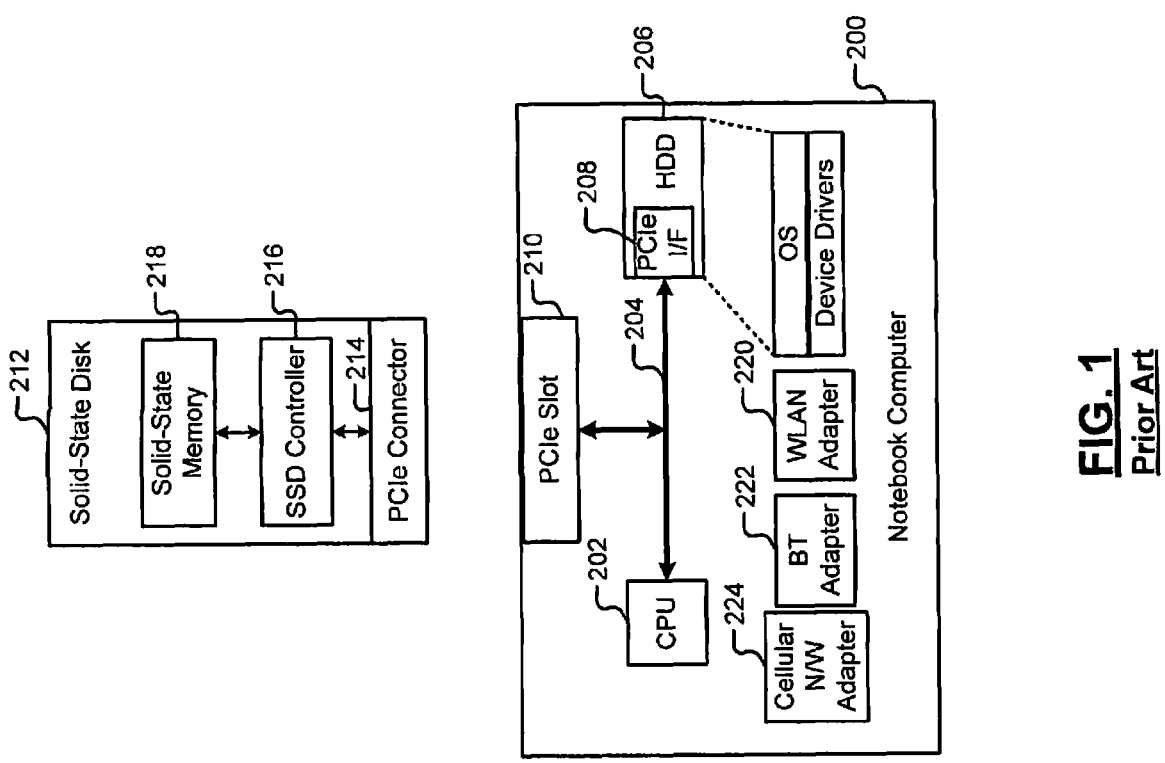
FIG. 1 is a functional block diagram of a notebook computer and an external solid-state disk (SSD) according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Utility of solid-state disks (SSDs) can be enhanced by integrating wireless network adapters into the SSD controllers. For example, when a SSD comprising a wireless network adapter is plugged into a laptop or notebook computer (hereinafter computer), the computer can communicate with other network devices via the network adapter integrated into the SSD in addition to caching data in the SSD. Additionally, the SSD with the integrated wireless network adapter can be used as a portable storage device that can communicate with any computer or device equipped with a wireless network adapter. By integrating the wireless network adapters into the SSDs instead of motherboards of the computers, cost and weight of the computers can be reduced.

The wireless network adapters may include at least one of a wireless local area network (LAN) adapter, a Bluetooth® (BT) adapter, and a cellular network adapter. The wireless network adapters may each comprise a secure digital input output (SDIO) interface. Accordingly, a SDIO interface module may be integrated into the SSD controllers to allow integration of the wireless network adapter into the SSD controllers. The SDIO interface is used only as an example throughout the disclosure. Any other suitable interface may be used instead.

Figure 2:
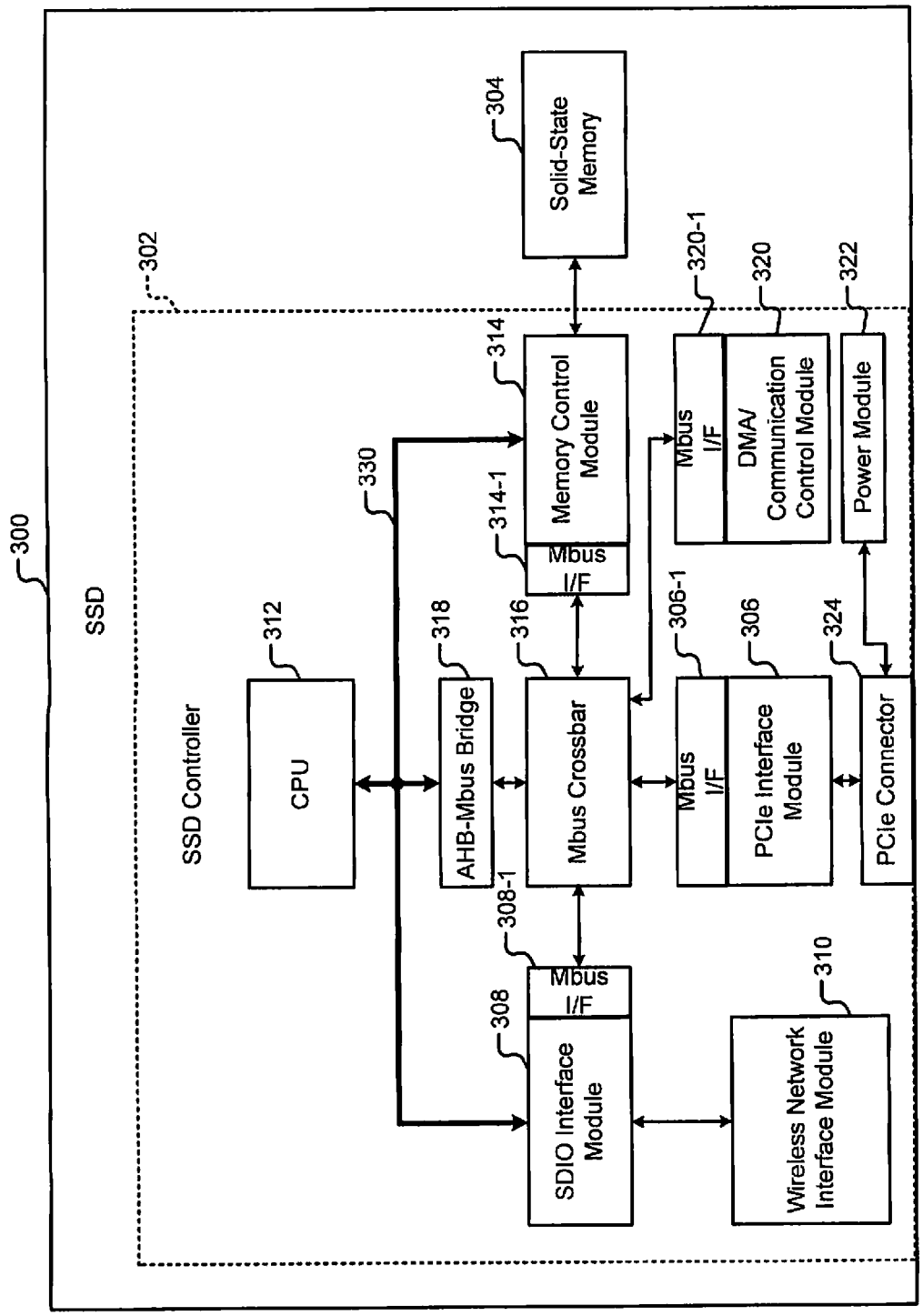
FIG. 2 is a functional block diagram of a SSD comprising a SSD controller according to the present disclosure.

Referring now to FIG. 2, an SSD 300 comprising an SSD controller 302 and solid-state memory 304 is shown. The SSD 300 may be manufactured as a 2.5" form-factor device. The solid-state memory 304 may include flash memory. The flash memory may include both single-level cell (SLC) and multi-level cell (MLC) flash memory. The SSD controller 302 may comprise a peripheral component interconnect express (PCIe) interface module 306, a SDIO interface module 308, a wireless network interface module 310, a central processing unit (CPU) 312, a memory control module 314, a master bus (Mbus) crossbar 316, and a PCIe connector 324.

Throughout the disclosure, the PCIe interface module 306 and the PCIe connector are used as examples only. Alternatively, the computer may provide another type of interface and a corresponding slot. Accordingly, another interface module implementing the other type of interface and a suitable connector may be used instead. Furthermore, the SDIO interface module 308 is also provided for example only; other types of interface may be used including without limitation UART, MMC, USB and PCI.

The CPU 312 controls the operation of the SSD 300. The CPU 312 communicates with the SDIO interface module 308 and the memory control module 314 via an advanced high-performance bus (AHB) 330. The CPU 312 communicates with the Mbus crossbar 316 via an AHB-Mbus bridge 318.

The SSD 300 plugs into a PCIe slot of a computer (not shown) via the PCIe connector 324. The PCIe interface module 306 interfaces the SSD controller 302 to the computer when the SSD 300 is plugged into the computer. The wireless network interface module 310 comprises wireless network adapters each having a SDIO interface (not shown). The SDIO interface module 308 interfaces the wireless network adapters to the computer via the PCIe interface module 306. The memory control module 314 controls the solid-state memory 304.

The PCIe interface module 306, the SDIO interface module 308, and the memory control module 314 include Mbus interfaces 306-1, 308-1, and 314-1, respectively. The PCIe interface module 306, the SDIO interface module 308, and the memory control module 314 communicate with the Mbus crossbar 316 via the Mbus interfaces 306-1, 308-1, and 314-1, respectively. The Mbus crossbar 316 allows communication between any of the modules having Mbus interfaces. Additionally, the Mbus crossbar 316 allows communication between the CPU 312 and any of the modules having Mbus interfaces.

In use, the Mbus crossbar 316 receives wireless data to be transmitted and cache data to be cached from the computer via the PCIe interface module 306. The Mbus crossbar 316 outputs the wireless data and the cache data to the SDIO interface module 308 and the memory control module 314, respectively. The SDIO interface module 308 outputs the wireless data to the wireless network interface module 310. The wireless network interface module 310 transmits the wireless data to other wireless network devices (not shown). The memory control module 314 outputs the cache data to the solid-state memory 304. The solid-state memory 304 caches the data.

Conversely, the Mbus crossbar 316 receives the wireless data and the cached data from the SDIO interface module 308 and the memory control module 314, respectively. The SDIO interface module 308 receives the wireless data from other wireless network devices via the wireless network interface module 310. The memory control module 314 receives cached data from the solid-state memory 304 when requested by applications running on the computer. The Mbus crossbar 316 routes the wireless data and the cached data to the PCIe interface module 306. The PCIe interface module 306 outputs the wireless data and the cached data to the computer.

Additionally, the SSD controller 302 comprises a direct memory access (DMA)/communication control module 320 and a power module 322. The DMA/communication module 320 includes an Mbus interface 320-1. The DMA/communication module 320 communicates with the Mbus crossbar 316 via the Mbus interface 320-1. The DMA/communication module 320 controls DMA to the solid-state memory 304. Additionally, the DMA/communication module 320 controls the communication between the Mbus crossbar 316 and each of the PCIe interface module 306, the SDIO interface module 308, the CPU 312, and the memory control module 314.

The power module 322 controls the power supplied to the SSD 300. For example, the power module 322 may receive DC power from the computer via the PCIe connector 324. The power module 322 may convert the DC power received from the computer to a level that is suitable for powering the SSD 300. Additionally, the power module 322 may regulate the power supplied to the SSD 300.

In some implementations, the SSD 300 may be used as a standalone portable storage device. Accordingly, the power module 322 may comprise a battery (not shown) that supplies power to the SSD 300 when the SSD 300 is not connected to the computer and is used as a standalone portable storage device. The battery may be rechargeable and may charge when connected to the computer.

Figure 3:
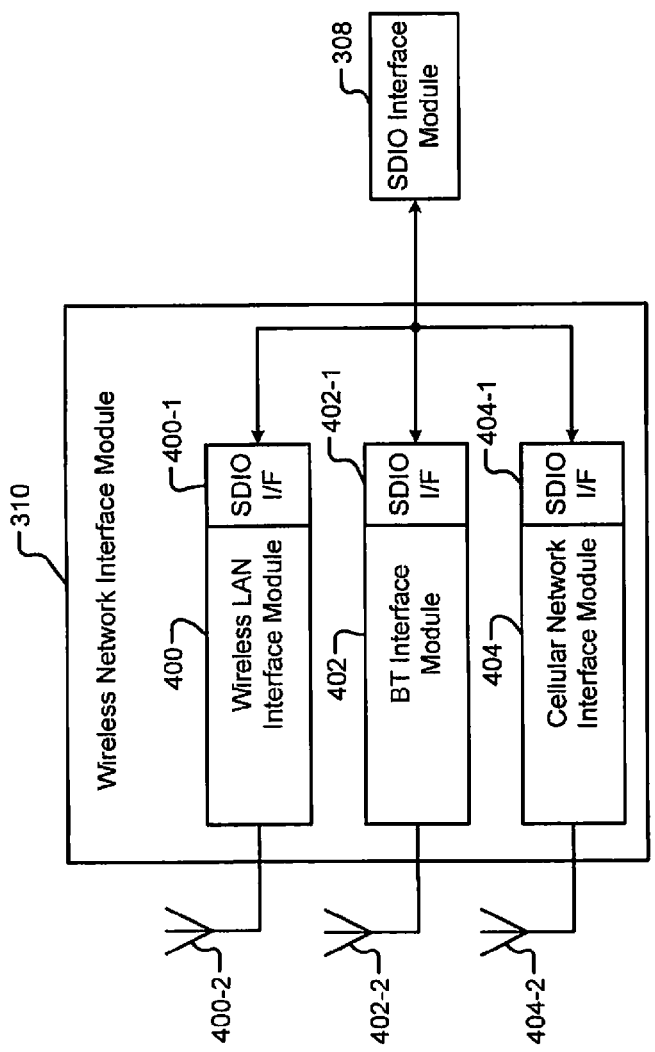
FIG. 3 is a functional block diagram of a wireless network interface module of the SSD controller of FIG. 2 according to the present disclosure.

Referring now to FIG. 3, the wireless network interface module 310 may comprise at least one of a wireless LAN interface module 400, a BT interface module 402, and a cellular network interface module 404. The wireless LAN interface module 400, the BT interface module 402, and the cellular network interface module 404 may comprise SDIO interfaces 400-1, 402-1, and 404-1, respectively. The wireless LAN interface module 400, the BT interface module 402, and the cellular network interface module 404 may comprise at least one antenna 400-2, 402-2, and 404-2, respectively. The SDIO interface module 308 interfaces with each of the wireless LAN interface module 400, the BT interface module 402, and the cellular network interface module 404.

Figure 4:
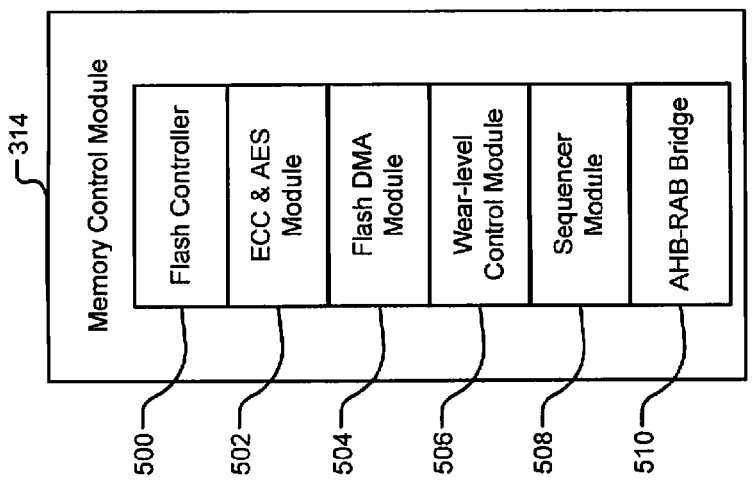
FIG. 4 is a functional block diagram of a memory control module of the SSD controller of FIG. 2 according to the present disclosure.

Referring now to FIG. 4, the memory control module 314 comprises a flash controller 500, an error-correction code (ECC) and advanced encryption standard (AES) module 502, a flash DMA module 504, a wear-level control module 506, a sequencer module 508, and an AHB-RAB bridge 510. The flash controller 500 controls read/write (R/W) operations of flash memory used in the solid-state memory 304. Additionally, the flash controller 500 performs other functions including bad-block management. The ECC & AES module 502 corrects errors and encrypts data during the RAN operations. The flash DMA module 504 controls DMA to the solid-state memory 304. The wear-level control module 506 determines wear-level of the solid-state memory 304. The sequencer module 508 controls sequencing of data transfer to and from the solid-state memory 304. When other devices integrated in the SSD 300 communicate with the memory control module 314 using a register access bus (RAB), the AHB-RAB bridge 510 bridges the AHB and the RAB. Specifically, the AHB-RAB bridge 510 converts protocols between the AHB and the RAB.

Figure 5:
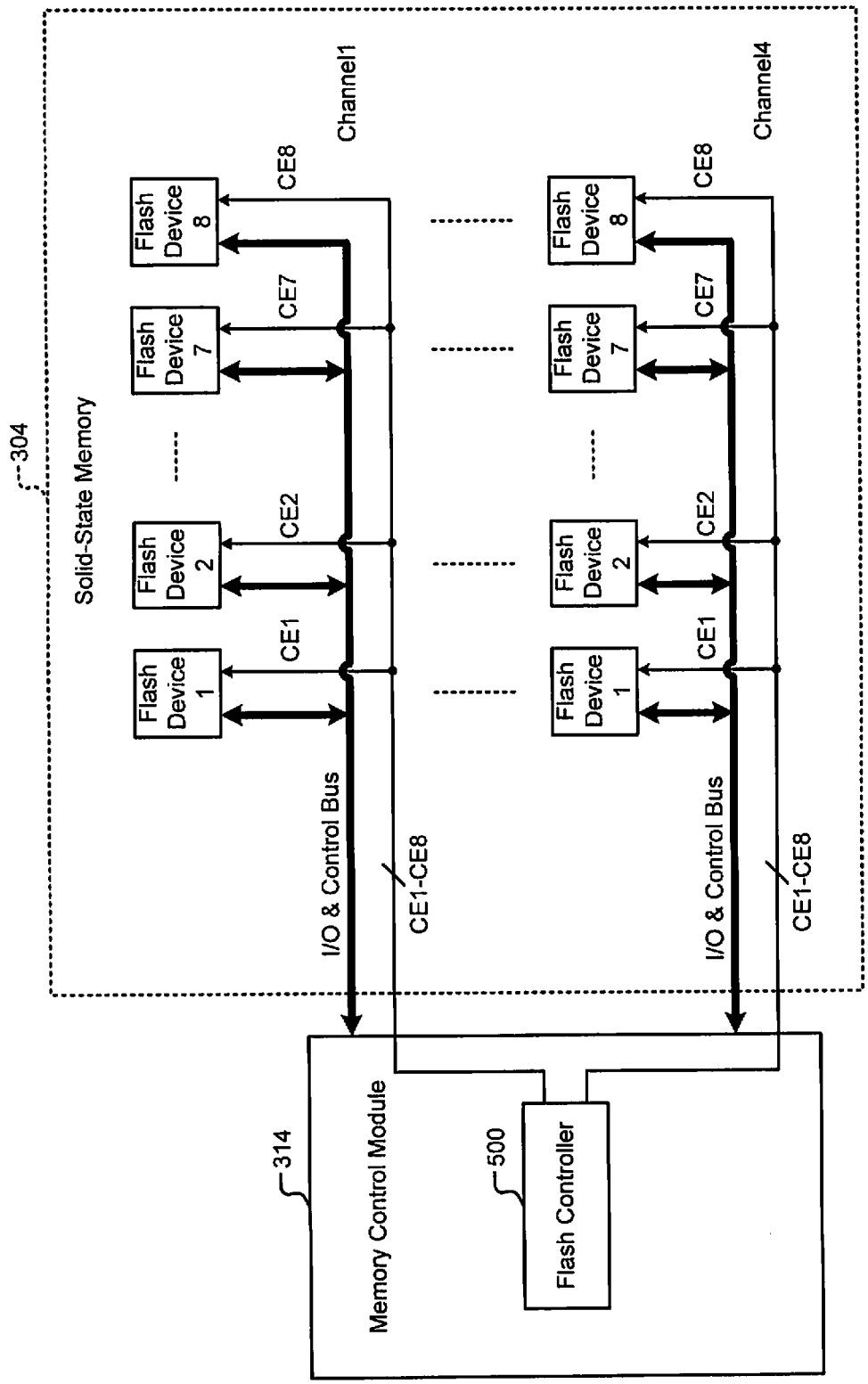
FIG. 5 is a functional block diagram of solid state memory of the SSD of FIG. 2 according to the present disclosure.

Referring now to FIG. 5, for example only, the solid-state memory 304 comprises N channels of flash memory, where N is an integer greater than or equal to 1. For example only, N=4. Each channel comprises M flash devices, where M is an integer greater than or equal to 1. For example only, M=8. A maximum value of M depends on the choice of flash components. Each channel includes an input/output (I/O) and control bus. In each channel, the flash devices share the I/O and control bus. The flash controller 500 generates M chip enable (CE) signals per channel. An $i^{th}$ CE signal generated for the $N^{th}$ channel enables an $i^{th}$ flash device of the $N^{th}$ channel during the RAN operations, where i is an integer, and $1 \leq i \leq M$.

When the flash devices include NAND flash devices, the solid-state memory 304 may conform to an open NAND-flash interface (ONFi) specification Rev 2.0, which is incorporated herein by reference in its entirety. The ONFi 2.0 specification includes a standard physical interface (e.g., pinouts of various NAND flash packages), a standard command set, and standard timing requirements for NAND flash.

Figure 6B:
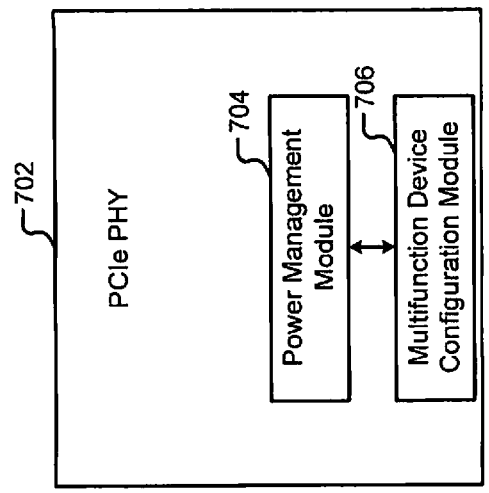
FIG. 6B is a functional block diagram of a physical layer (PHY) device of the PCIe interface module of FIG. 6A according to the present disclosure.
Figure 6A:
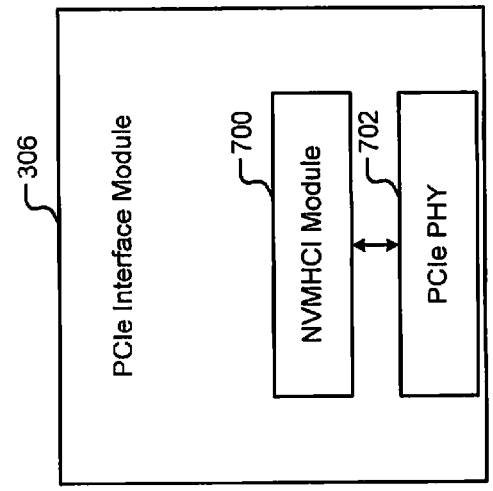
FIG. 6A is a functional block diagram of a peripheral component interconnect express (PCIe) interface module of the SSD controller of FIG. 2 according to the present disclosure.

Referring now to FIGS. 6A and 6B, the PCIe interface module 306 comprises a nonvolatile memory host controller interface (NVMHCI) module 700 and a PCIe physical layer (PHY) device 702. In FIG. 6A, the NVMHCI module 700 includes a register level interface and a command set for nonvolatile memory (e.g., flash memory) called the NVM-HCI. The NVMHCI specifies an interface between system software (e.g., an operating system (OS), device drivers, etc.) of the computer and the SSD controller 302. A specification for NVMHCI is described in the NVMHCI Specification Rev 1.0, which is incorporated herein by reference in its entirety.

In FIG. 6B, the PCIe PHY device 702 comprises a power management module 704 and a multifunction device configuration module 706. The power management module 704 manages the power consumption of the SSD 300. For example, the power management module 704 provides PCIe sleep mode support for waking up the PCIe PHY device 702. The multifunction device configuration module 706 configures the PCIe interface module 306 to perform multiple functions.

For example, the functions may include Function1 and Function2. Function1 may include storage functions (e.g., caching data). Function2 may include communication functions (e.g., wirelessly transmitting or receiving data). Accordingly, the PCIe interface module 306 may perform storage and communication functions when configured to perform Function1 and Function2, respectively. The multifunction device configuration module 706 informs the computer whether Function1 or Function2 is being performed at any given time. Additionally, the PCIe PHY device 702 supports message signaled interrupts (MSIs).

Figure 7:
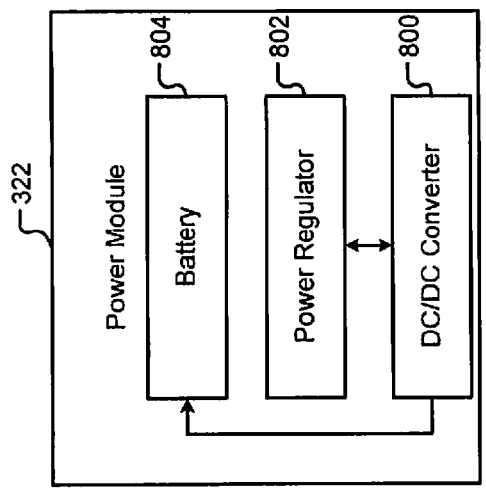
FIG. 7 is a functional block diagram of a power module of the SSD controller of FIG. 2 according to the present disclosure.

Referring now to FIG. 7, the power module 322 comprises a DC/DC converter 800, a power regulator 802, and a battery 804. The DC/DC converter 800 receives DC power from the computer via the PCIe connector 324. The DC/DC converter 800 converts the DC power to a level that is suitable for powering the SSD 300. The power regulator 802 regulates the power supplied by the DC/DC converter 800 to the SSD 300.

When the SSD 300 is used as a standalone portable storage device, the power module 322 may comprise the battery 804 that supplies power to the SSD 300 while the SSD 300 is not connected to the computer. The battery 804 may be rechargeable and may charge via the DC/DC converter 800 when connected to the computer.

Figure 8A:
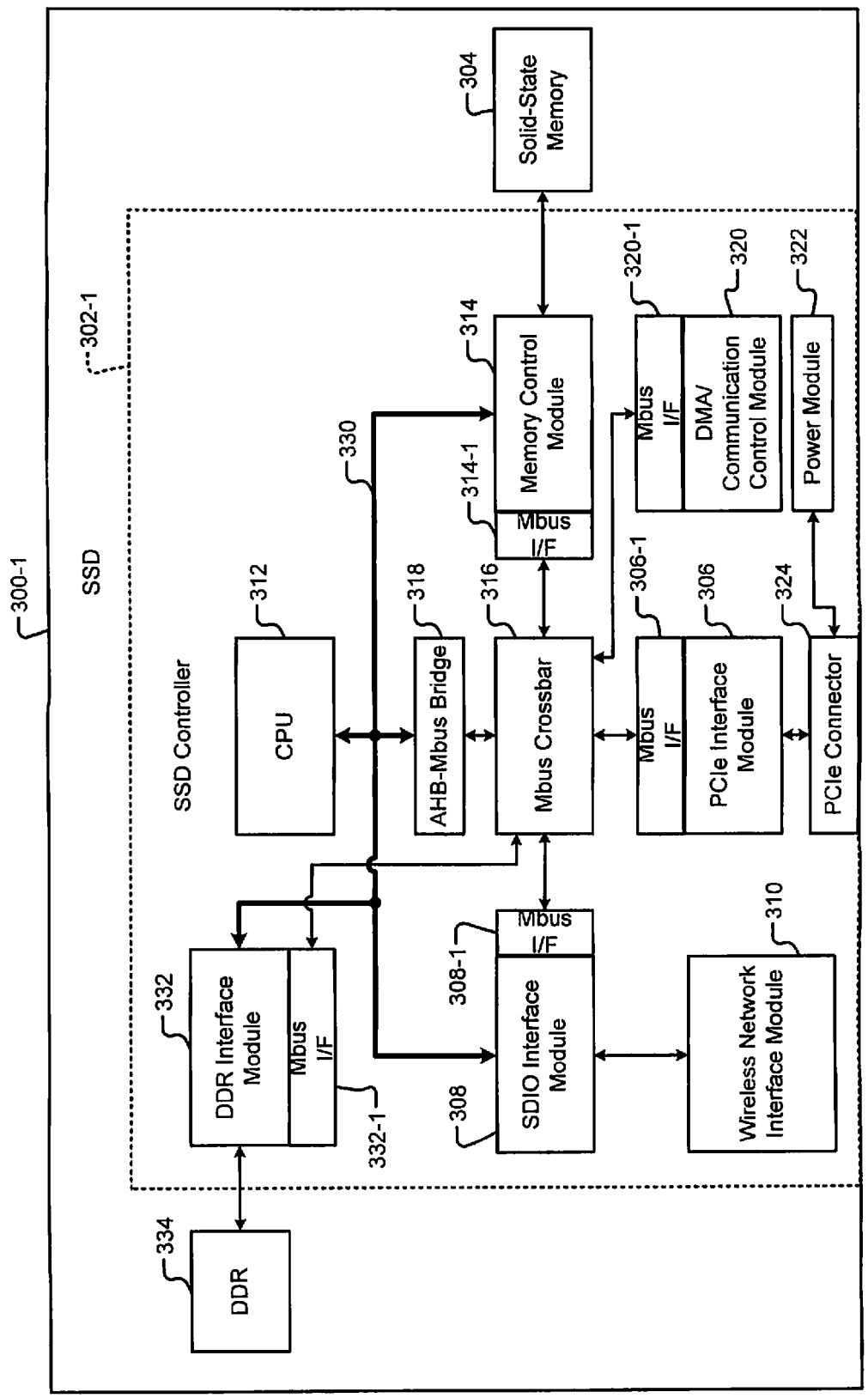
FIG. 8A is a functional block diagram of a SSD comprising double-data-rate (DDR) memory according to the present disclosure.
Figure 8B:
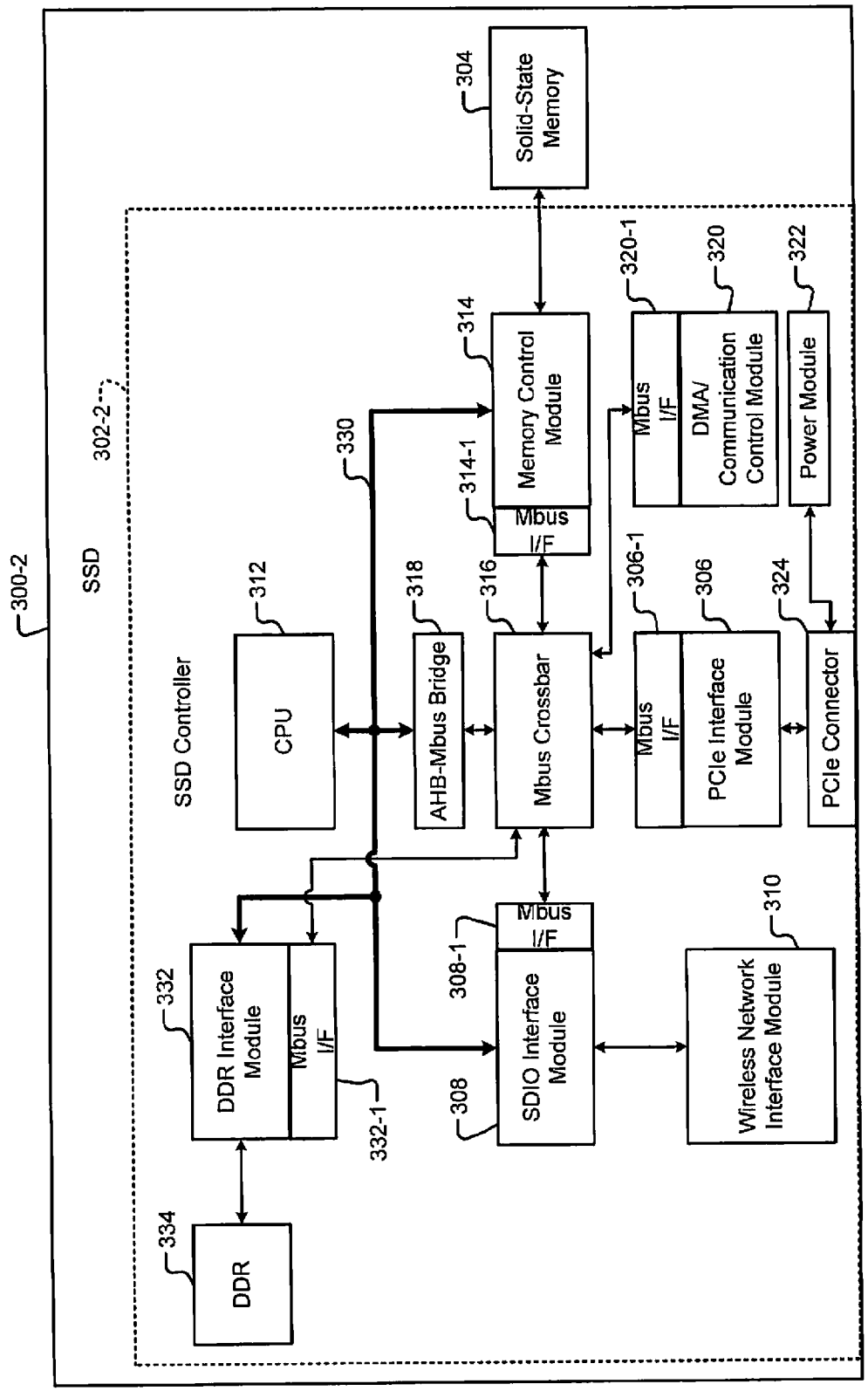
FIG. 8B is a functional block diagram of a SSD comprising DDR memory according to the present disclosure.

Referring now to FIGS. 8A and 8B, SSDs 300-1 and 300-2 comprising double-data-rate (DDR) memory are shown. The SSDs 300-1 and 300-2 may be manufactured as 2.5" form-factor devices. DDR memory includes synchronous dynamic random access memory (SDRAM). In conventional SDRAM, data transfers occur on either rising or falling edges of clock signals during R/W operations. In DDR SDRAM, data transfers occur on both rising and falling edges of clock signals during R/W operations. Consequently, bandwidth of DDR memory is approximately twice the bandwidth of conventional memory.

In FIG. 8A, the SSD 300-1 comprises all of the components of the SSD 300 and additionally includes a DDR interface module 332 and DDR memory 334. Specifically, an SSD controller 302-1 comprises all of the components of the SSD controller 302 and includes the DDR interface module 332. The SSD controller 302-1 does not include the DDR memory 334.

In FIG. 8B, the SSD 300-2 comprises all of the components of the SSD 300 and additionally includes the DDR interface module 332 and DDR memory 334. Specifically, an SSD controller 302-2 comprises all of the components of the SSD controller 302-1 and additionally includes the DDR memory 334.

The DDR interface module 332 controls the DDR memory 334. The DDR interface module 332 communicates with the CPU 312 and the memory control module 314 via the AHB 330. Additionally, the DDR interface module 332 includes an Mbus interface 332-1. The DDR interface module 332 communicates with the Mbus crossbar 316 via the Mbus interface 332-1.

The DDR memory 334 may be used for various purposes. For example, the DDR memory 334 may buffer data to be cached in the solid-state memory 304. The DDR memory 334 may buffer data received by the wireless network interface module 310 from the other wireless network devices. The DDR memory 334 may buffer data to be transmitted by the wireless network interface module 310 to the other wireless network devices, etc.

All of the components of the SSD controllers 302 and 302-1 except the wireless network interface module 310 can be integrated into a single multi-chip module (MCM) called an SSD controller MCM. Integrating the SSD controllers 302, 302-1 in the SSD controller MCM allows for packaging maximum amount of solid-state memory 304 in the SSDs 300, 300-1. In some implementations, the SSD controller MCM may include the wireless network interface module 310.

Figure 9:
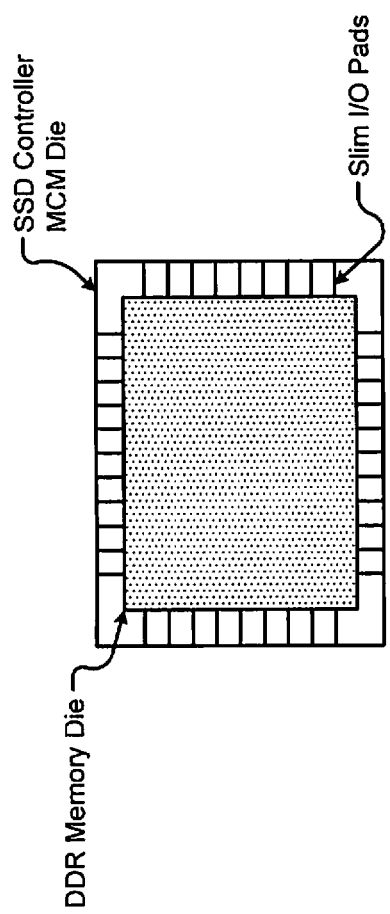
FIG. 9 is a schematic of a die comprising DDR memory stacked on a die comprising a SSD controller according to the present disclosure.

Referring now to FIG. 9, the DDR memory 334 and the SSD controller MCM may be manufactured on first and second dies, respectively. The size and cost of the SSDs 300, 300-1 can be reduced by stacking the first die comprising the DDR memory 334 on top of the second die comprising the SSD controller MCM as shown. Sub 100-μm slim I/O pads may be used to interconnect the first and second dies.

Referring now to FIGS. 10A-10C, the SSDs 300, 300-1, and 300-2 (collectively SSDs 300n) may be used as portable wireless storage devices to store data. In FIG. 10A, the SSD 300n may communicate with a computer 1000. The computer 1000 may include a wireless LAN adapter 1001. The SSD 300n may communicate with the computer 1000 via the wireless LAN interface module 400. The SSD 300n may retrieve data from the computer 1000 and store the data on the SSD 300n. Additionally, the SSD 300n may transfer data stored in the SSD 300n to the computer 1000.

In FIG. 10B, the SSD 300n may communicate with a wireless network device 1002. The wireless network device 1002 may include a wireless LAN adapter, a BT adapter, and/or a cellular network adapter (all not shown). The SSD 300n may communicate with wireless network device 1002 via the LAN interface module 400, the BT interface module 402, and/or the cellular network interface module 404. The SSD 300n may retrieve data from the wireless network device 1002 and store the data on the SSD 300n. Additionally, the SSD 300n may transfer data stored in the SSD 300n to the wireless network device 1002.

In FIG. 10C, the SSD 300n may communicate with a wireline network device 1004 connected to a wireless LAN 1006 via a suitable LAN adapter (not shown). The SSD 300n may communicate with the wireline network device 1004 via the LAN interface module 400. The SSD 300n may retrieve data from the wireline network device 1004 and store the data in the SSD 300n. Additionally, the SSD 300n may transfer data stored in the SSD 300n to the wireline network device 1004.

Different external devices may be used to configure the SSD 300n when the SSD 300n is used as a portable wireless storage device. Specifically, the external devices may set security features (e.g., a password) of the SSD 300n to protect the data stored on the SSD 300n and to prevent unauthorized access to the SSD 300n. The external devices may include any of the computer 1000, the wireless network device 1002, and the wireline network device 1004. Additionally or alternatively, the external devices may include a cellular phone.

Typically, the ECC and AES module 502 of the memory control module 314 may encrypt the data stored on the SSD 300n. Access to the data stored on the SSD 300n may be secured using the security features. For example, the security features may include passwords. The external devices may be used to set and enter passwords to access the SSD 300n when storing and/or retrieving data to/from the SSD 300n.

Figure 11A:
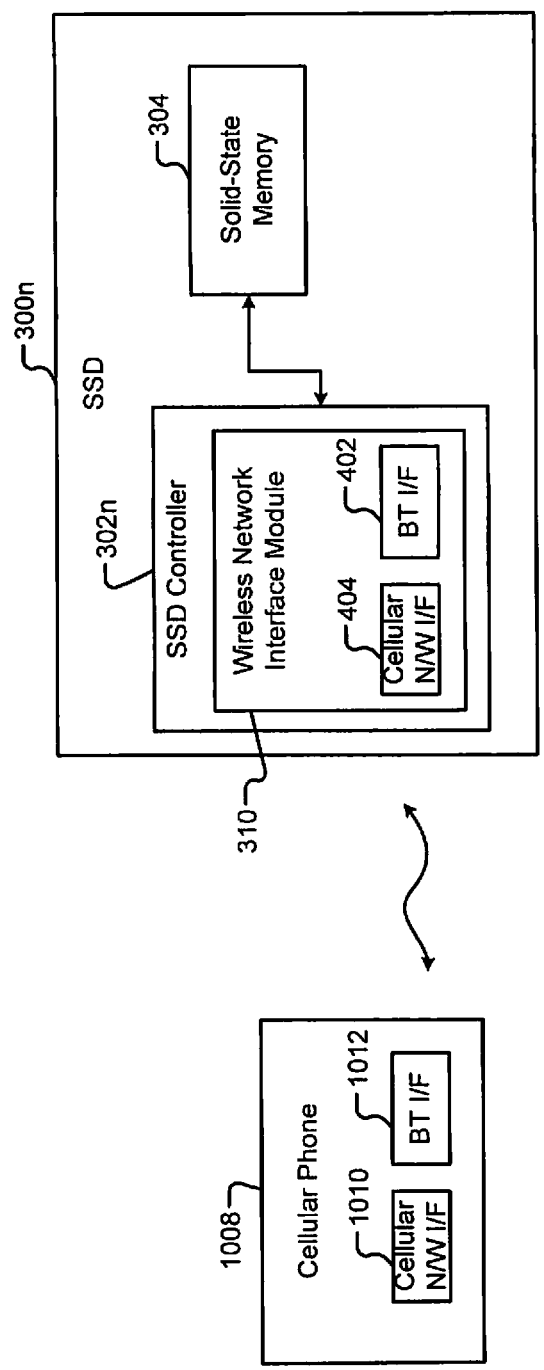
FIG. 11A is a functional block diagram of a SSD that communicates with a cellular phone according to the present disclosure.

Referring now to FIG. 11A, a cellular phone 1008 may be used to configure the SSD 300n. A SSD controller 302n denotes the SSD controller 302, 302-1, or 302-2. The cellular phone 1008 may include a cellular network interface 1010 and/or a BT interface 1012. The cellular network interface 1010 and/or the BT interface 1012 may communicate with the cellular network interface module 404 and/or the BT interface module 402 of the SSD 300n, respectively. A user may use a keypad of the cellular phone 1008 to set and enter the password to access the SSD 300n.

Figure 11B:
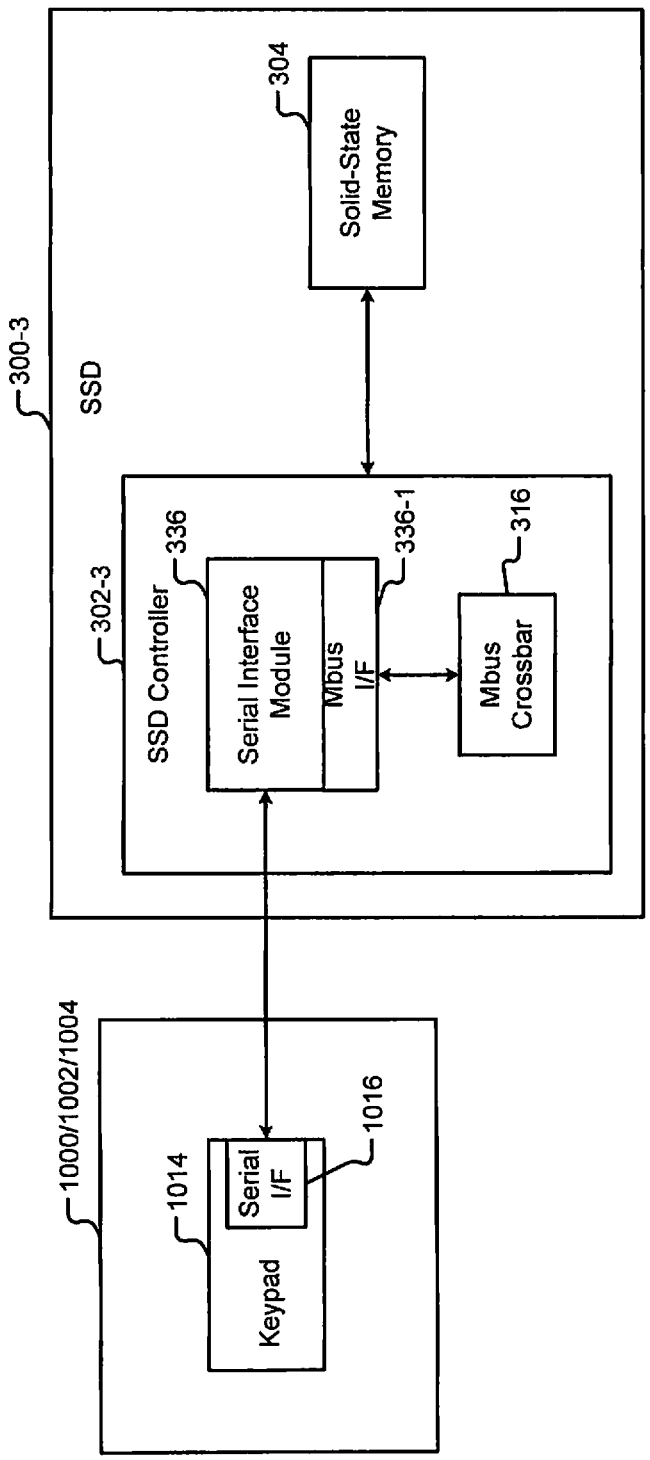
FIG. 11B is a functional block diagram of a SSD that communicates with an external keypad according to the present disclosure.

Referring now to FIG. 11B, a keypad 1014 of any of the computer 1000, the wireless network device 1002, and the wireline network device 1004 may be used to configure an SSD 300-3. The computer 1000 may use the keypad 1014 in addition to or instead of wireless LAN adapter 1001 to configure an SSD 300-3. The wireless network device 1002 may use the keypad 1014 in addition to or instead of the wireless LAN adapter, the BT adapter, and/or the cellular network adapter of the wireless network device 1002 to configure an SSD 300-3. The wireline network device 1004 may use the keypad 1014 in addition to or instead of the LAN adapter of the wireline network device 1004 to configure an SSD 300-3.

The keypad 1014 may include a serial interface 1016 for communication. The serial interface 1016 may be implemented using a universal asynchronous receiver transmitter (UART) IC. The SSD 300-3 comprises all of the components of the SSD 300n and additionally includes a serial interface module 336. Specifically, the SSD 300-3 comprises an SSD controller 302-3 that includes all of the components of the SSD controllers 302n and additionally includes the serial interface module 336.

The serial interface module 336 may implement a serial interface that is compatible with the serial interface 1016 using the UART IC. Additionally, the serial interface module 336 includes an Mbus interface 336-1. The serial interface module 336 communicates with the Mbus crossbar 316 via the Mbus interface 336-1. The keypad 1014 communicates with the serial interface module 336 via the serial interface 1016. The user may use the keypad 1014 to set and enter the password to access the SSD 300n. Additionally, the user may use the keypad 1014 to enter commands for transferring data to and from the SSD 300n.

Additionally, the SSDs 300n, 300-3 can be used as boot disks. The boot time of the computer can be reduced by storing OS files in the SSD 300n, 300-3 and booting from the SSD 300n, 300-3 instead of an HDD. When the computer boots, a device driver for the SSD 300n, 300-3 intercepts the boot request and routes the boot request to the SSD 300n, 300-3 instead of the HDD.

Figure 12:
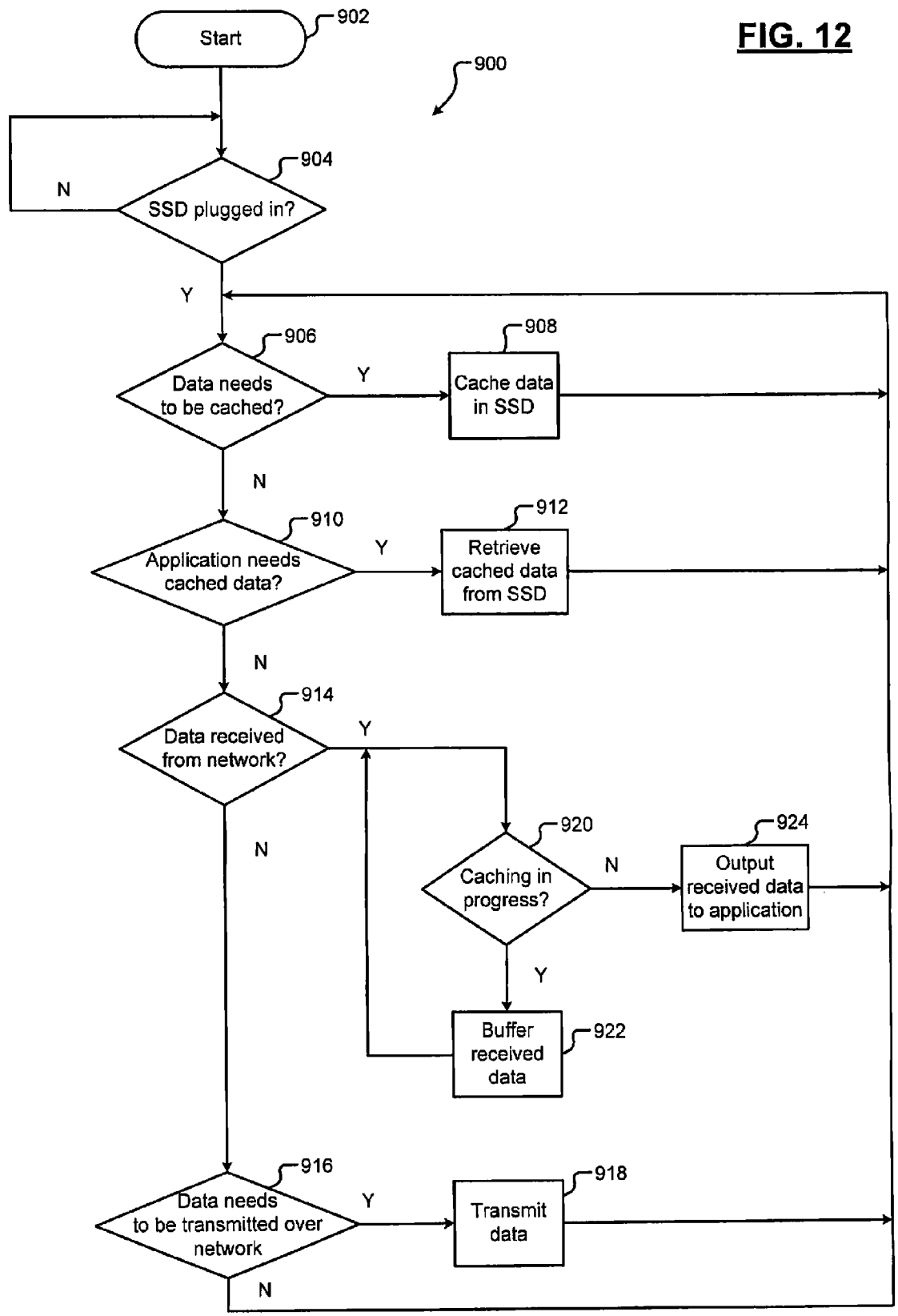
FIG. 12 is a flowchart of a method for caching data from a notebook computer to a SSD and for communicating wirelessly via the SSD according to the present disclosure.

Referring now to FIG. 12, steps of a method 900 for caching data to the SSD 300n and communicating wirelessly via the wireless network interface module 310 of the SSD 300n are shown. Control begins in step 902. Control determines in step 904 whether the SSD 300n is plugged into the PCIe slot 210 of the notebook computer 200. Control waits if the result of step 904 is false. If the result of step 904 is true, control determines in step 906 whether data from the notebook computer 200 needs to be cached. If the result of step 906 is true, control caches the data in the SSD 300n in step 908, and control returns to step 906.

If the result of step 906 is false, control determines in step 910 if any applications running on the notebook computer 200 need data that is cached in the SSD 300n. If the result of step 910 is true, control retrieves cached data from the SSD 300n and outputs the cached data to the notebook computer 200 in step 912, and control returns to step 906.

If the result of step 910 is false, control determines in step 914 whether the wireless network interface module 310 received data from any of the other wireless network devices. If the result of step 914 is false, control determines in step 916 whether the notebook computer 200 needs to transmit data to any of the other wireless network devices via the wireless network interface module 310. If the result of step 916 is true, the wireless network interface module 310 transmits the data in step 918, and control returns to step 906.

If the result of step 914 is true, control determines in step 920 if data is being cached from the notebook computer 200 to the SSD 300n or data cached in the SSD 300n is being output to the notebook computer 200. If the result of step 920 is true, control buffers the data received by the wireless network interface module 310 in step 922, and control returns to step 920. If the result of step 920 is false, control outputs data received by the wireless network interface module 310 to the notebook computer 200 in step 924, and control returns to step 906.

Figure 13:
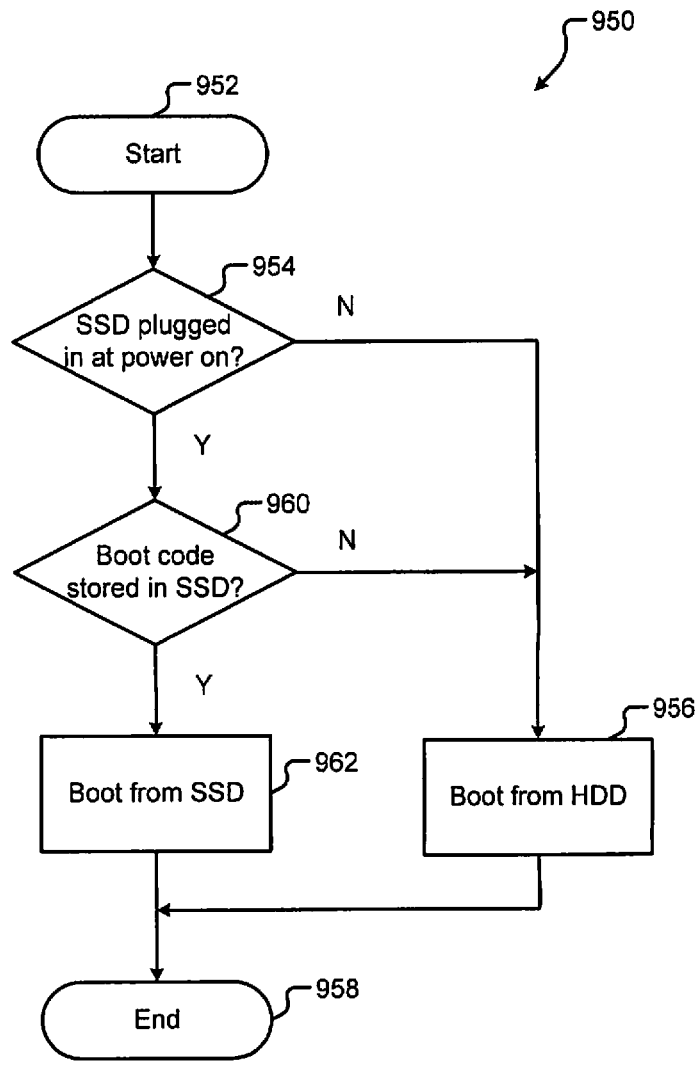
FIG. 13 is a flowchart of a method for booting a notebook computer from a SSD according to the present disclosure.

Referring now to FIG. 13, steps of a method 950 for booting the notebook computer 200 are shown. Control begins in step 952. Control determines in step 954 whether the SSD 300n is plugged into the PCIe slot 210 of the notebook computer 200 when power to the notebook computer 200 is turned on. If the result of step 954 is false, the notebook computer 200 boots from an internal HDD of the notebook computer 200 in step 956, and the method 950 ends in step 958. If the result of step 954 is true, control determines in step 960 whether boot code for the notebook computer 200 is stored in the SSD 300n. Control returns to step 956 if the result of step 960 is false. If the result of step 960 is true, the notebook computer 200 boots from the SSD 300n in step 962, and the method 950 ends in step 958.

Figure 14:
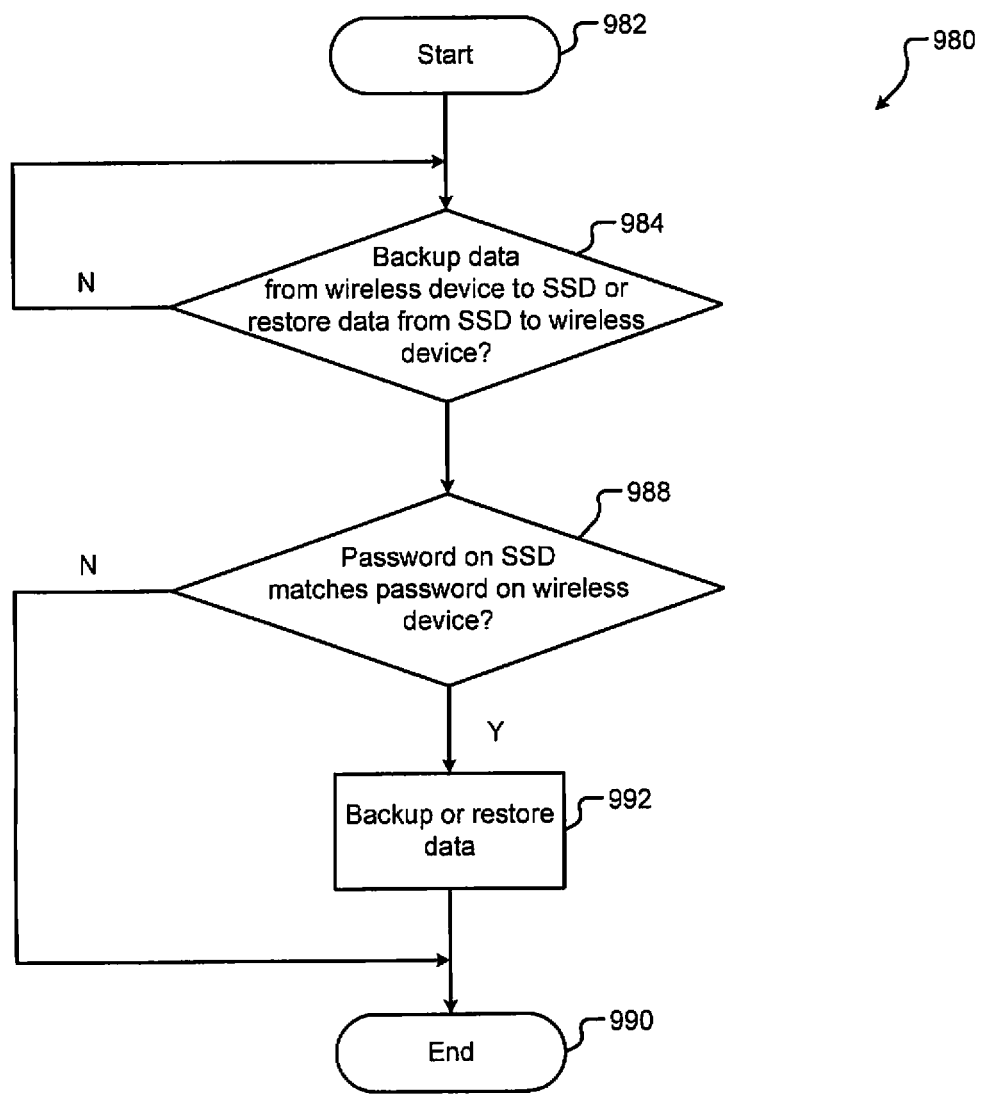
FIG. 14 is a flowchart of a method for backing up and restoring data from devices to a SSD that communicates wirelessly with the devices according to the present disclosure.

Referring now to FIG. 14, steps of a method 980 for using the SSD 300n to backup and restore data are shown. Control begins in step 982. Control determines in step 984 whether data from a wireless device is to be backed up to the SSD 300n or restored from the SSD 300n to the wireless device. Control waits if the result of step 984 is false. If the result of step 984 is true, control determines in step 988 if the password stored on the SSD 300n matches the password stored on the wireless device. The method 980 ends in step 990 if the password is invalid. If the password is valid, control backs up data from the wireless device to the SSD 300n or restores data from the SSD 300n to the wireless device in step 992, and the method 980 ends in step 990.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A solid-state disk (SSD) controller comprising:
a first integrated circuit (IC) including:
an interface module configured to externally interface the SSD controller to a computing device;
a memory control module configured to:
control solid-state memory,
receive data from the computing device via the interface module, and
cache the data in the solid-state memory;
a wireless network interface module configured to communicate with the computing device via the interface module, the wireless network interface module further configured to permit the computing device to connect to a wireless network;
a crossbar module having a master bus (Mbus) interface, wherein the interface module, the memory control module, and the wireless network interface module each includes a respective Mbus interface configured to communicate with the crossbar module via the Mbus interface of the crossbar module;

a processor configured to communicate with the memory control module, the wireless network interface module, and the crossbar module via an advanced high-performance bus (AHB);

an AHB-to-Mbus bridge configured to bridge the AHB to the Mbus interface of the crossbar module; and double-data-rate (DDR) memory configured to communicate with at least one of the wireless network interface module and the crossbar module via at least one of the AHB and the Mbus interface, wherein, in response to (i) data being cached from the computing device to the solid-sate memory or (ii) data cached in the solid-state memory being output to the computing device, the wireless network interface module is configured to receive, from the wireless network, data to be output to the computing device; and buffer, in the DDR memory, the data received from the wireless network.

2. The SSD controller of claim 1, wherein the computing device is selected from a group consisting of a laptop computer, a personal digital assistant (PDA), a cellular phone, and an MP3 player.

3. The SSD controller of claim 1, wherein the interface module comprises a peripheral component interconnect express (PCIe) interface.

4. The SSD controller of claim 1, wherein the first IC comprises a secure digital input output (SDIO) interface module, wherein the SDIO interface module is configured to interface the wireless network interface module to the interface module.

5. The SSD controller of claim 4 wherein:

the wireless network interface module comprises at least one of:
 a wireless local area network (WLAN) interface module,
 a Bluetooth® (BT) interface module, and
 a cellular network interface module;

the at least one of the WLAN interface module, the BT interface module, and the cellular network interface module includes an SDIO interface; and the SDIO interface is configured to communicate with the SDIO interface module.

6. A solid-state disk (SSD) comprising the SSD controller of claim 1, wherein the SSD further comprises a second IC that includes the solid-state memory.

7. The SSD of claim 6, wherein the solid-state memory comprises (N*M) flash memory devices that are arranged in N channels, and wherein each of the N channels includes M of the (N*M) flash memory devices, where N and M are integers greater than 1.

8. The SSD of claim 7, wherein the memory control module comprises a wear-level control module configured to determine wear-levels of the (N*M) flash memory devices.

9. The SSD of claim 7, wherein N=4, and wherein M=8.

10. The SSD of claim 7, wherein the memory control module is configured to selectively generate at least one of (N*M) chip enable signals, and wherein the at least one of (N*M) chip enable signals selects a corresponding one of the (N*M) flash memory devices.

11. The SSD of claim 6 wherein, the SSD is configured to:
communicate with a wireless network device external to the SSD via the wireless network interface module,
selectively store first data received from the wireless network device in the solid-state memory, and
selectively transfer second data from the solid-state memory to the wireless network device.

12. The SSD of claim 6, wherein the SSD has a 2.5-inch form-factor.

13. The SSD controller of claim 1, wherein the interface module comprises a physical layer (PHY) device, wherein the PHY device interfaces the interface module to a bus of the computing device, and wherein the PHY device configures the interface module to operate in at least one of a caching mode and a wireless communication mode.

14. The SSD controller of claim 1, wherein the memory control module comprises an encryption module configured to encrypt the data.

15. The SSD controller of claim 1, wherein the interface module comprises a nonvolatile memory host controller interface (NVMHCI) module, wherein the NVMHCI module is configured to interface the solid-state memory to an operating system (OS) of the computing device.

16. The SSD controller of claim 1, wherein the solid-state memory stores a boot code for the computing device, and wherein the computing device boots using the boot code.

17. A system comprising:

a single multi-chip module (MCM) manufactured on a first integrated circuit (IC), wherein the single MCM includes a solid-state disk (SSD) controller, the SSD controller comprising:

an interface module configured to externally interface the SSD controller to a computing device;

a memory control module configured to:
 control solid-state memory,
 receive data from the computing device via the interface module, and
 cache the data in the solid-state memory;

a secure digital input output (SDIO) interface module configured to interface a wireless network interface module to the interface module; and a crossbar module having a master bus (Mbus) interface, wherein the interface module, the memory control module, and the SDIO interface module each includes a respective Mbus interface configured to communicate with the crossbar module via the Mbus interface of the crossbar module;

a processor configured to communicate with the memory control module, the SDIO interface module, and the crossbar module via an advanced high-performance bus (AHB); and an AHB-to-Mbus bridge configured to bridge the AHB to the Mbus interface of the crossbar module; and a second IC stacked on top of the first IC, wherein the second IC further comprises double-data-rate (DDR) memory configured to communicate with at least one of the SDIO interface module and the crossbar module via at least one of the AHB and the Mbus interface; and wherein in response to (i) data being cached from the computing device to the solid-sate memory or (ii) data cached in the solid-state memory being output to the computing device, the wireless network interface module is configured to receive, from the wireless network, data to be output to the computing device; and buffer, in the DDR memory, the data received from the wireless network.

18. The system of claim 17, wherein the second IC comprises double-data-rate (DDR) memory configured to communicate with at least one of the interface module, the memory control module, and the SDIO interface module.

19. The system of claim 17, wherein the interface module comprises a peripheral component interconnect express (PCIe) interface.

20. The system of claim 17, wherein the first IC comprises the wireless network interface module, and wherein the wireless network interface module comprises at least one of a wireless local area network (WLAN) interface module, a Bluetooth® (BT) interface module, and a cellular network interface module.

21. The system of claim 17, wherein the computing device is selected from a group consisting of a laptop computer, a personal digital assistant (PDA), a cellular phone, and an MP3 player.

22. A solid-state disk (SSD) comprising the system of claim 17, wherein the SSD further comprises a third IC, and wherein the third IC includes the solid-state memory and communicates with the first IC.

23. The SSD of claim 22 further comprising a fourth IC, wherein the fourth IC includes the wireless network interface module, and wherein the wireless network interface module comprises at least one of a wireless local area network (WLAN) interface module, a Bluetooth® (BT) interface module, and a cellular network interface module.

24. The system of claim 17, wherein the first and second ICs communicate via sub 100-μm input/output (I/O) pads.

\* \* \* \* \*